March 21, 1967 J. PICKLES Re. 26,173
TOP LIFT ASSEMBLY
Original Filed Dec. 17, 1962 2 Sheets-Sheet 1
FIG. 1.
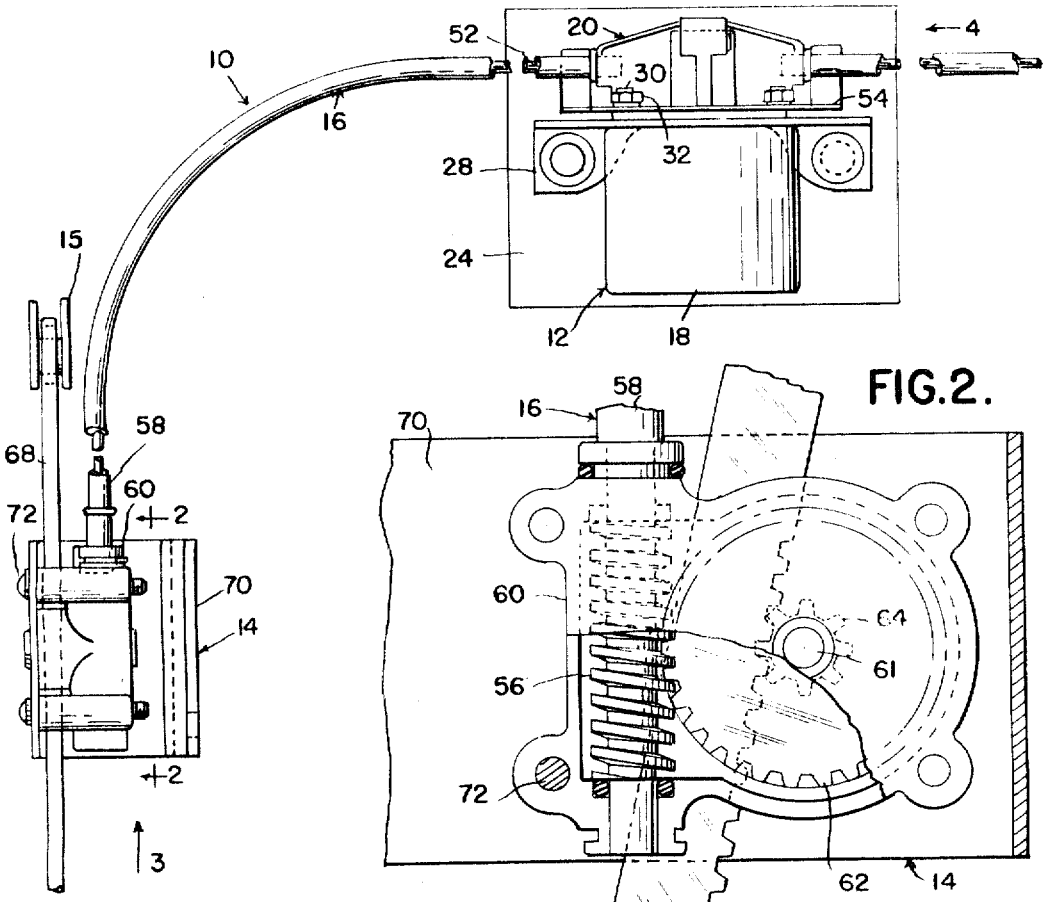
FIG. 2.
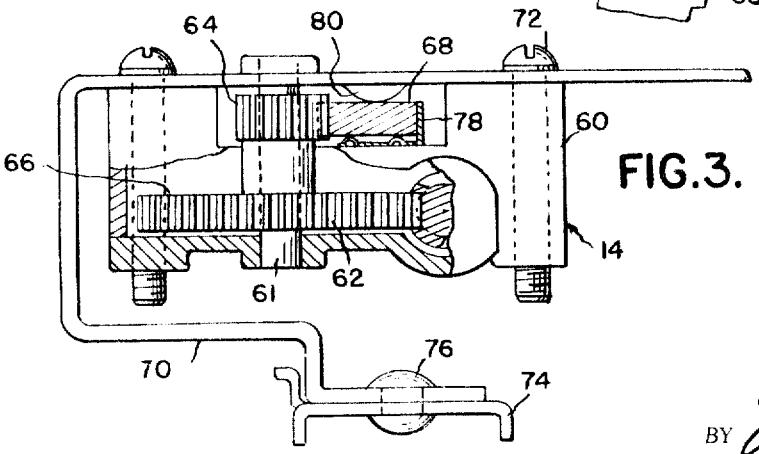
FIG. 3.
INVENTOR.
JOSEPH PICKLES
BY Whittemore Hulbert & Belknap
ATTORNEYS

TOP LIFT ASSEMBLY

Original Filed Dec. 17, 1962 2 Sheets-Sheet 2

INVENTOR.
JOSEPH PICKLES
BY
ATTORNEYS

United States Patent Office

Re. 26,173
Reissued Mar. 21, 1967

26,173
TOP LIFT ASSEMBLY

Joseph Pickles, Dearborn, Mich., assignor to Ferro Manufacturing Corporation, a corporation of Michigan Original No. 3,248,970, dated May 3, 1966, Ser. No. 245,126, Dec. 17, 1962. Application for reissue June 27, 1966, Ser. No. 564,707
7 Claims. (Cl. 74—665)

Matter enclosed in heavy brackets [ ] appears in the original patent but forms no part of this reissue specification; matter printed in italics indicates the additions made by reissue.

The invention relates to top lift assemblies for convertible automobiles and the like and refers more specifically to a convertible top lift assembly including a single ended drive motor, rack and pinion actuating structures and synchronizing means for automatically adjusting the operation of the actuating structures.

In the past lift assemblies for convertible tops and the like have been constructed of extensible screws located at each side of the top to be lifted operable in conjunction with a double ended electric drive motor therefor. Such assemblies are relatively expensive and require separate adjustment of the extensible screws at each side of the top to be lifted so that both sides of the top or other structure lifted reach the limits of travel thereof simultaneously.

Hydraulic cylinders have sometimes been substituted for the extensible screws so that the separate adjustment of the extensible screws and the double ended electric motor are eliminated in the top lift assemblies. However, the hydraulic cylinders are inefficient and require the installation of a separate hydraulic system.

It is therefore an object of the present invention to provide an improved electro-mechanical top lift assembly for convertible automobile tops and the like.

Another object is to provide an electro-mechanical top lift assembly for convertible automobile tops or the like including centrally located electric drive means and a pair of simplified mechanical actuating structures positioned at opposite sides of the top to be lifted.

Another object is to provide a top lift assembly as set forth above wherein the drive means includes a single, single ended motor.

Another object is to provide a top lift assembly as set forth above wherein the mechanical actuating structures are rack and pinion structures.

Another object is to provide a top lift assembly as set forth above including synchronizing means for automatically adjusting the rack and pinion actuating structures so that both sides of the top lifted will reach both limiting positions simultaneously.

Another object is to provide a top lift assembly as set forth above wherein the mechanical actuating structures are driven from a single drive means and the synchronizing means comprises a slip coupling in conjunction with the single drive means.

Another object to provide a top lift assembly which is simple in construction, economical to manufacture and efficient in use.

Other objects and features of the invention will become apparent as the description proceeds, especially when taken in conjunction with the accompanying drawings, illustrating a preferred embodiment of the invention, wherein;

FIGURE 1 is a partial top view of a top lift assembly constructed in accordance with the invention.

FIGURE 2 is an enlarged partially broken away section view of the mechanical actuating structure of the top lift assembly of the invention taken on the line 2—2 of FIGURE 1.

FIGURE 3 is an enlarged elevation view of the mechanical actuating structure illustrated in FIGURE 2 taken in the direction of arrow 3 in FIGURE 2.

Figure 4:
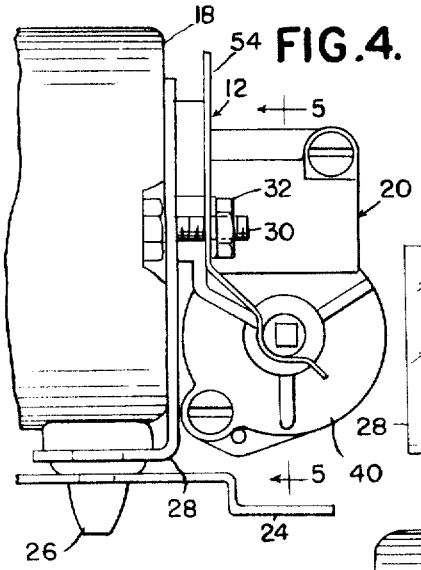
FIGURE 4 is an enlarged partial side view of the drive means of the top lift assembly illustrated in FIGURE 1 taken in the direction of arrow 4 in FIGURE 1.

With particular reference to the figures one embodiment of the present invention will now be considered.

As shown best in FIGURE 1 the top lift assembly 10 comprises drive means 12 which may be centrally located with respect to a top indicated diagrammatically at 15 to be lifted. For example, the drive means 12 may be located on the floor 24 of a convertible automobile either beneath the front or rear seat thereof. Top lift assembly 10 also includes the mechanical actuating structures 14 which are positioned at opposite sides of the top to be lifted. Only one of the mechanical actuating structures 14 of the top lift assembly 10 which is symmetrical about the center line of the drive means 12 is illustrated in FIGURE 1.

In operation when it is desired to lift top 15 the drive means 12 is energized to produce rotation of the flexible cable 52 of the torque transfer structures 16 connecting the drive means 12 with the mechanical actuating structures 14 in a predetermined direction. Rotation of the flexible cable 52 operates the mechanical actuating structures 14 to lift the top 15 connected thereto. Energization of the drive means 12 to produce opposite rotation of the flexible cable 52 will cause lowering of the roof 15 in a similar manner.

More specifically the drive means 12 includes a reversible single ended electric motor 18 and coupling structure 20. Electric motor 18 furnishes the drive power for the top lift assembly 10 which is coupled from the output shaft 22 of the motor 18 to coupling structure 20. Motor 18 may be mounted on the floor 24 of a vehicle by means of the shock mounting 26 in conjunction with the mounting bracket 28 to which the motor 18 is secured by convenient means, such as bolts 30 and nuts 32.

Figure 5:
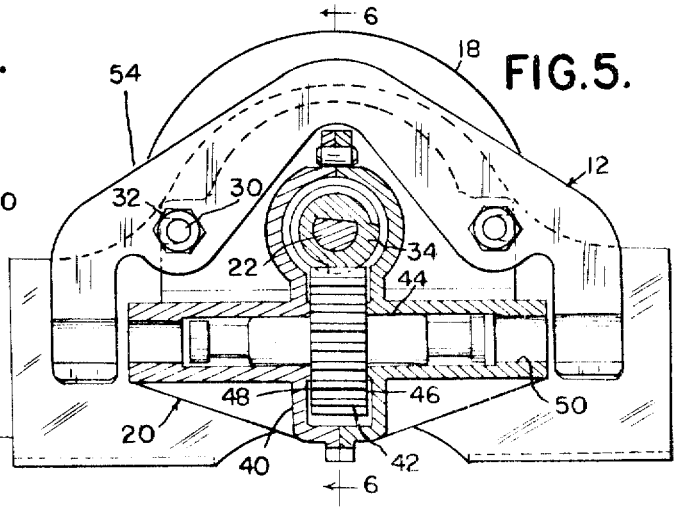
FIGURE 5 is an enlarged section view of the drive means illustrated in FIGURE 4 taken substantially in the direction of arrows 5—5 in FIGURE 4.
Figure 6:
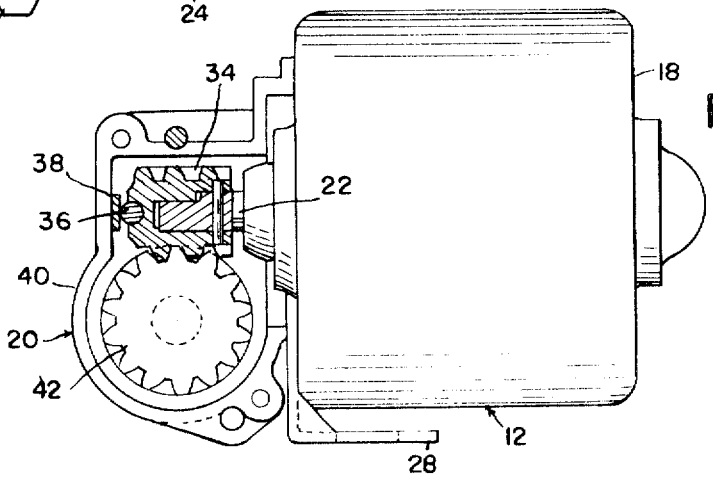
FIGURE 6 is an enlarged partial section view of the drive means illustrated in FIGURE 1 taken substantially on the line 6—6 in FIGURE 5.

Coupling structure 20 between the motor shaft 22 and the torque transfer structures 16 includes a driven worm 34 secured to the shaft 22 for rotation therewith having a thrust bearing 36, as best shown in FIGURE 6, in one end thereof abutting a bearing plate 38 carried by the housing 40 of the coupling means 20 and a worm gear 42 rotatably mounted in the housing 40 and engaged with the worm 34 for rotation thereby. The worm gear 42 has the flexible cable coupling members 44, best shown in FIGURE 5, secured to the opposite sides 46 and 48 thereof and concentric therewith mounted for rotation in housing 40.

In assembly the flexible cable 52 of the torque transfer structures 16 are inserted into the openings 50 in the housing 40 and secured to the coupling members 44 by convenient means, such as non-cylindrical mating male and female ends on the cables 52 and the coupling members 44. The torque transfer structures 16 are held in position in the openings 50 of the housing 40 by means of the resilient bracket 54 secured to the mounting bracket 23 for the motor 18 by means of the bolts 30 and nuts 32 as shown best in FIGURES 4 and 5. Housing 40 is similarly secured to the mounting bracket 23 by means of the bolts 30 and nuts 32, as shown best in FIGURE 6.

Thus in operation it will be seen that rotation of the motor 18 in opposite directions will cause rotation of the worm 34 in opposite directions and corresponding rotation of the worm gear 42, coupling members 44 and the cables 52 of the torque transfer structures 16 in opposite directions.

Torque transfer structures 16 comprise the inner flexible cable 52 for transmitting torque between the worm gear 42 and the worm 56 of the mechanical actuating structures 14 and the other flexible non-rotating cover 58 for cable 52. As shown best in FIGURE 1 the flexible cable 52 is connected at opposite ends to the worm gear 42 and the worm 56 while the flexible covering therefor is non-rotatably secured to the housing 40 of the coupling structure 20 by resilient bracket 54 and the housing 60 of the mechanical actuating structure 14 by convenient means (not shown).

Mechanical actuating structure 14 which as above indicated is duplicated on each side of the top 15 includes the worm 56 rotatably mounted in housing 60 in mesh with the worm gear 62 also rotatably mounted in the housing 60 on shaft 61. The pinion 64 is mounted on shaft 61 for rotation with gear 62 and may be secured to or integral with worm gear 62. Pinion 64 is engaged with the rack 68 for producing axial movement of the rack in opposite directions to lift or lower the roof 15 in accordance with the direction of rotation of the worm 56 by the flexible cable 52.

Housing 60 of the mechanical actuating structure 14 is secured to a mounting bracket 70 by convenient means such as the bolts 72. The bracket 70 is secured to one end of an elongated arm 74 by convenient means such as rivet 76. The other end of the arm 74 is pivotally secured to a rigid support (not shown) to provide arcuate movement of the rack and pinion in operation.

In over-all operation when the motor 18 is driven in opposite directions the worm 34, worm gear 42, flexible cable 52, worm 60, worm gear 62 and pinion 64 are similarly rotated in opposite directions to cause the rack 68 engaged with pinion 64 for sliding movement between bushing 78 and the indentation 80 in bracket 70 to raise or lower top 15. Thus it will be seen that there is provided in accordance with the invention an extremely simple, economical top lift assembly which while being reversible is driven by a single ended motor 18 and while providing sufficient power for operating the usual convertible top with the usual motor limitations uses extremely efficient rack and pinion mechanical actuating means.

For example it is required that 1200 inch pounds of force be provided at each side of the usual convertible top for actuation thereof. With a maximum permissible fractional horsepower electrical motor 18 and with the worm and worm gear in coupling means 20 set to provide a maximum sixteen to one mechanical advantage at seventy percent efficiency of transferring electrical energy into torque 112 inch pounds of torque may be developed in the cable 52. With a worm 56 having a radius of one-fourth inch a total torque of 448 inch pounds is provided at worm gear 66. With an additional three to one mechanical advantage between the worm gear 66 and pinion 64 in the mechanical actuating structure 14, 1350 inch pounds of force are provided for use at each side of the top 15.

Figure 7:
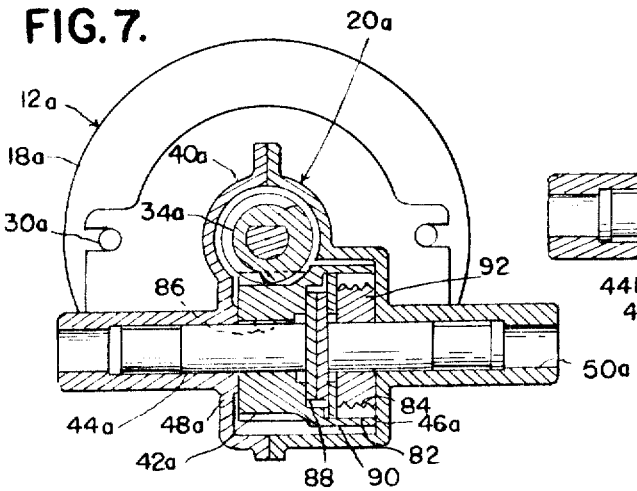
FIGURE 7 is a section view of a modification of the drive means illustrated in FIGURE 1 similar to the partial section view of FIGURE 5.

A modified coupling structure 20a is illustrated in FIGURE 7 and provides synchronizing means 82 for adjusting the mechanical actuating structures 14 at the opposite sides of top 15 so that the opposite sides of a top 15 arrive at both the upper and lower limiting position simultaneously. In the modified coupling structure 20a elements similar to those of coupling structure 20 have been given similar numerals, followed by the suffix a.

The synchronizing means 82 includes the modified worm gear 42a having a stepped recess 84 in the side 46a thereof, the headed coupling members 44a one of which is secured to the worm gear 42a for rotation therewith by convenient means, such as key 86 are positioned as shown in FIGURE 7 with their heads 88 in surface-to-surface contact. The heads 88 of the coupling members 44a are held in surface-to-surface contact by means of the washer 90 and removable plug 92 threaded in the recess 84.

In operation of the modified coupling structure 20a, illustrated in FIGURE 7, during operation of the motor 18 while driving the rack 68 between limiting positions of the top 15, both coupling members 44a are driven in rotation with the worm gear 42a. Should the mechanical actuating structure 14 connected to the coupling member 44a not secured to the worm gear 42a for rotation therewith reach either an upper or lower limit before the other mechanical actuating structure 14 has reached an upper or lower limit the heads 88 of the coupling member 44a which are in the nature of clutch plates will slip relative to each other until the coupling member 44a connected to the worm gear 42a for rotation therewith reaches a similar limiting position.

After operating a top lift assembly modified in accordance with the synchronizing structure illustrated in FIGURE 7 to both limits of movement of the racks 68 the mechanical actuating structure 14 will be adjusted to bring both sides of the top 15 to the same limits simultaneously.

Figure 8:
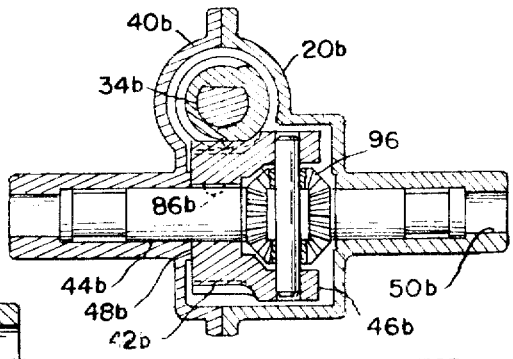
FIGURE 8 is a partial section view of another modification of the drive means illustrated in FIGURE 1 similar to the partial section view of FIGURE 5.

While one embodiment of the present invention and one modification thereof have been disclosed in detail other embodiments and modifications of the invention are contemplated. For example, a differential assembly 96 as illustrated in FIGURE 8, wherein the suffix b is used to designate similar elements, may be substituted for the synchronizing means 82 illustrated in FIGURE 7. It is the intention to include all embodiments and modifications of the invention that are defined by the appended claims within the scope of the invention.

What I claim as my invention is:

1. A lift assembly for convertible tops and the like comprising a single, single ended reversible electric motor including a drive shaft, a mounting bracket for mounting the motor substantially centrally, laterally of an automobile with the drive shaft extending longitudinally of the automobile, a worm fixedly secured to said drive shaft for rotation therewith, a worm gear having a stepped recess in one side thereof engaged with said worm, a housing secured to said bracket for rotatably mounting the worm gear in mesh with said worm, a pair of headed coupling members concentric with and extending from opposite sides of said worm gear having clutch surfaces on the heads thereof in engagement within the stepped recess in the worm gear, slot and key means for securing one of the coupling members to the worm gear for rotation therewith, a washer within the stepped recess, and plug means threadedly secured in the stepped recess for urging the washer into engagement with the heads of the coupling members in engagement with the bottom of the recess to vary the pressure on the coupling surfaces thereof, a separate housing at each side of the automobile, a worm rotatably mounted in each of the separate housings, a flexible shaft extending from each of the coupling members to a respective worm in the housings at the side of the automobile, a worm gear rotatably mounted within each of the housings at the side of the automobile in mesh with the worm therein, a pinion within each of the housings at the side of the automobile connected to said worm gear for rotation therewith, a separate rack extending through each of the housings at the side of the automobile engaged with the pinion in each of the housings and means for guiding the rack through the housing on linear movement thereof due to rotation of the respective pinion engaged therewith and means connecting one end of each rack to the convertible top of the automobile.

2. A lift assembly for convertible tops and the like comprising a pair of rack and pinion mechanical actuating structures in spaced apart relation, single drive means including a single, single ended motor for driving said rack and pinion structures having a drive shaft, a [worm] *first gear* secured to the drive shaft, a [worm] *second* gear engaged with said [worm] *first gear* and driven thereby provided with a recess in one side thereof, coupling members extending from opposite sides of the [worm] *second* gear having heads positioned within the recess in the [worm] *second* gear with clutch surfaces thereon, means for securing the heads of the coupling members within said recess with the clutch surfaces thereof in engagement to provide a slip coupling therebetween permitting relative rotation between the coupling members and means positively securing only one of the coupling members to the [worm] *second* gear for rotation therewith, separate force transfer structure extending between the single drive means and each of the mechanical actuating structures and means for coupling the separate force transfer structures between the single drive means and the respective mechanical actuating structures.

3. A differential coupling comprising a housing, means for rotatably mounting a [worm] *first gear* within the housing, a [worm] *second* gear rotatably mounted in the housing in mesh with said [worm] *first gear,* coupling members extending from opposite sides of the [worm] *second* gear one of which extends through and is fixedly secured to the [worm] *second* gear for rotation therewith, and means for coupling the other coupling member to the one coupling member for relative rotation with respect thereto on application of a predetermined torque therebetween, including a recess in one side of the [worm] *second* gear, a head on each of the coupling members within the recess in the [worm] *second* gear having engaged clutch surfaces thereon, a washer within the recess engaged with the head of one of the coupling members urging the head of the other coupling member into engagement with the bottom of the recess, and plug means threadedly received within the recess for urging the washer into engagement with the head of the one coupling member.

4. A differential coupling comprising a housing, means for rotatably mounting a [worm] *first gear* within the housing, a [worm] *second* gear rotatably mounted in the housing in mesh with said [worm] *first gear,* coupling members extending from opposite sides of the [worm] *second* gear one of which extends through and is fixedly secured to the [worm] *second* gear for rotation therewith, and means for coupling the other coupling member to the one coupling member for relative rotation with respect thereto on application of a predetermined torque therebetween, including a recess in one side of the [worm] *second* gear, bevelled gear portions on the coupling members positioned within the recess in the [worm] *second* gear, a pin extending radially of the [worm] *second* gear across the recess therein between the coupling members and a pair of bevel gears positioned on said pin in mesh with the bevel gear portions of the coupling members.

5. Drive structure for a top lift assembly on an automobile wherein mechanical actuating structure is provided at each side of the autombile operable to raise and lower the automobile top on actuation of the drive structure, comprising a single, single ended motor positioned centrally of the automobile, a pair of flexible drive cables extending in opposite directions from the motor to operate the separate actuating structures on axial rotation thereof and drive means between the motor and flexible drive cables comprising a gear extending axially, longitudinally of the automobile and driven by the single, single ended motor and a second gear having an axis extending transversely of the automobile at right angles to the axis of the first gear positioned in mesh with the first gear for rotation on actuation of the motor to rotate the first gear and means connecting the flexible cables to the second gear for axial rotation on rotation of the second gear.

*6. Drive structure for a top lift assembly on an automobile wherein mechanical actuating structure is provided at each side of the automobile operable to raise and lower the automobile top on actuation of the drive structure, comprising a single, single ended motor positioned centrally of the automobile, a pair of flexible drive cables extending in opposite directions from the motor to operate the separate actuating structures on axial rotation thereof and drive means between the motor and flexible drive cables comprising a gear having an axis extending longitudinally of the automobile and driven by the single, single ended motor and a second gear having an axis extending transversely of the automobile in mesh with the first gear for rotation on actuation of the motor to rotate the first gear and means connecting the flexible cables to the second gear for axial rotation on rotation of the second gear.*

*7. Drive structure for a top lift assembly on an automobile wherein mechanical actuating structure is provided at each side of the automobile operable to raise and lower the automobile top on actuation of the drive structure, comprising a single, single ended motor positioned centrally of the automobile, a pair of flexible drive cables extending in opposite directions from the motor to operate the separate actuating structures on axial rotation thereof and drive means between the motor and flexible drive cables comprising a gear driven by the single, single ended motor and a second gear having an axis extending transversely of the automobile at right angles to the longitudinal axis of the automobile positioned in mesh with the first gear for rotation on actuation of the motor to rotate the first gear and means connecting the flexible cables to the second gear for axial rotation on rotation of the second gear.*

References Cited by the Examiner

The following references, cited by the Examiner, are of record in the patented file of this patent or the original patent.

UNITED STATES PATENTS

| | | | |
|---|---|---|---|
| 805,122 | 11/1905 | Dennis | 64—2 |
| 828,875 | 8/1906 | Bullard | 74—422 |
| 1,063,416 | 6/1913 | Cook | 15—31 |
| 1,371,875 | 3/1921 | Douros | 15—23 |
| 1,464,077 | 8/1923 | Kennedy | 74—65 |
| 2,119,399 | 5/1938 | Muschong | 74—91 |
| 2,470,985 | 5/1949 | Illshce | 74—91 |
| 2,581,171 | 1/1952 | Carlson | 74—91 X |
| 2,832,233 | 4/1958 | Allgaier et al. | 74—674 |
| 2,958,263 | 11/1960 | Palkowski | 74—91 |
| 2,977,807 | 4/1961 | Conover | 74—665 |
| 3,049,935 | 8/1962 | Simmons et al. | 74—665 |

FOREIGN PATENTS

| | | |
|---|---|---|
| 29,247 | 12/1911 | Great Britain. |

FRED C. MATTERN, Jr., *Primary Examiner.*

W. S. RATLIFF, *Assistant Examiner.*